United States Patent Office 3,553,099
Patented Jan. 5, 1971

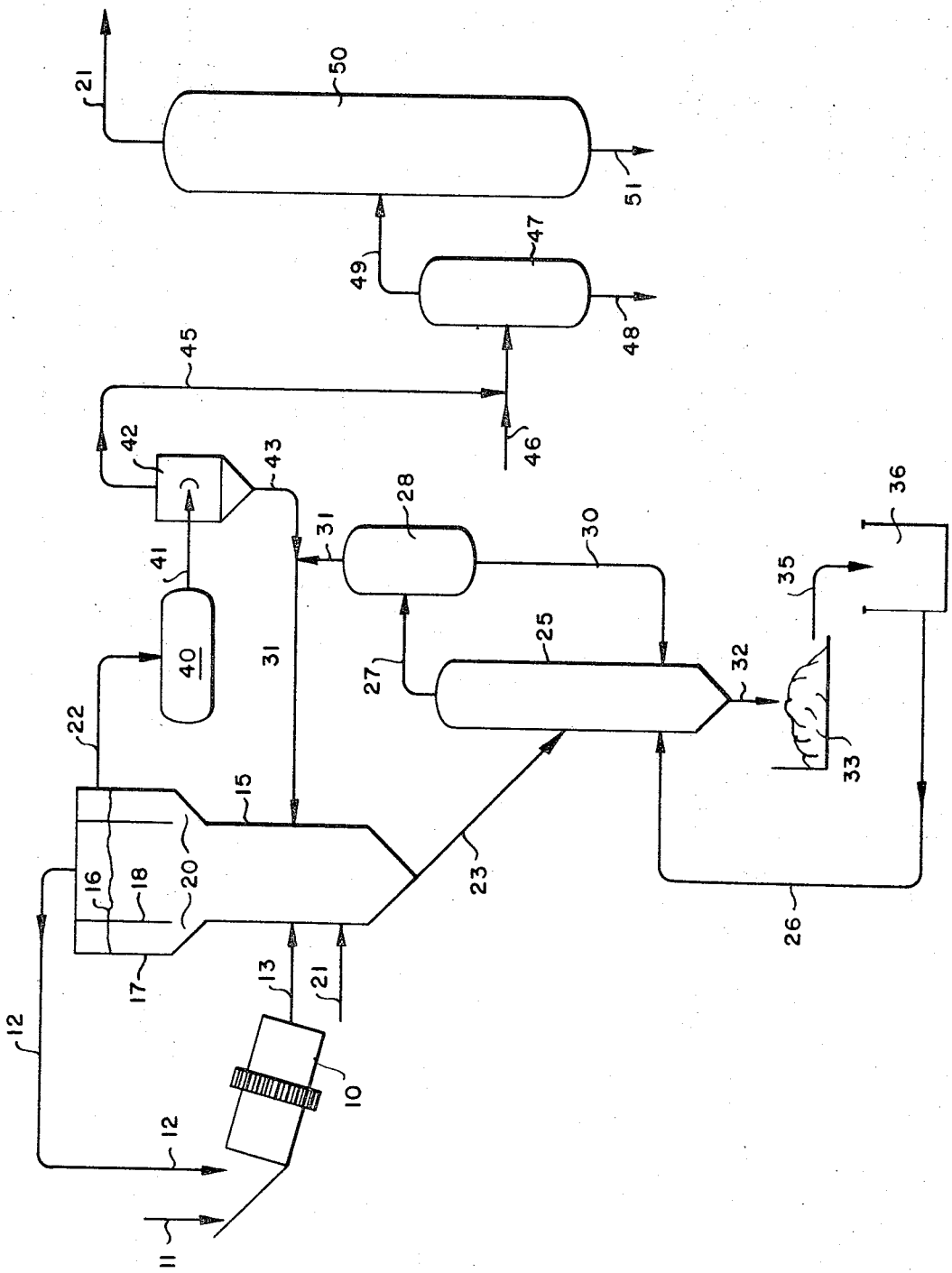

3,553,099
PROCESS FOR EXTRACTING TAR FROM TAR SAND
William E. Savage, Castro Valley, and Harry A. Cheney, Berkeley, Calif., assignors to Shell Oil Company, New York, N.Y., a corporation of Delaware
Filed Oct. 30, 1968, Ser. No. 771,959
Int. Cl. C10g 1/04
U.S. Cl. 208—11                                                6 Claims

ABSTRACT OF THE DISCLOSURE

Separating tar from tar sand in a process where fines are excluded from the product with minimum particle separation equipment and solvent losses to the separated sand are very small, including maintaining a mobile bed of sand particles in a rising solvent stream in an extraction zone, withdrawing a solvent-tar mixture through a passageway that starts laterally within the mobile bed and terminates above it, the mixture being low in fines due to the filtering action of the mobile bed, and subjecting the solvent-tar stream to particle separation and solvent recovery, removing a sand-solvent stream from a lower portion of the mobile bed in the extraction zone and introducing it into an elutriation zone wherein a mobile bed of sand is maintained in a rising water stream, withdrawing liquid from the upper portion of the elutriation zone, separating it into a water phase and a hydrocarbon phase, returning the hydrocarbon phase to the extraction zone, returning water phase to the elutriation zone, and withdrawing water and sand from the lower portion of the elutriation zone.

BACKGROUND

As liquid crude oil becomes less available, less direct sources of petroleum become increasingly attractive. One such source of petroleum is tar sand. Tar sand, as the name indicates, consists of sand particles that are coated with tar. This material naturally occurs as deposits that can be mined. Although tar sand represents a good source of petroleum, it is necessary to separate the tar from the sand by a process that is economically competitive with other sources of petroleum, such as liquid crude, to make the use of tar sand profitable.

Many approaches to recovering tar from tar sand have been employed. The approaches include solvent extraction, water displacement of the tar, and thermal cracking or distillation of the tar, to mention a few. Of these solvent extraction is attractive because tar recovery is good; but in order to be commercially useful, it is necessary that solvent recovery be almost complete because the solvent employed is worth so much more than the tar that is recovered. The problem of solvent recovery is magnified because the sand represents so much of the material that is worked on that even very small percentage losses of solvent in the discarded sand cannot be tolerated. Solvent extraction of tar from tar sand involves mixing the tar sand with a solvent for the tar to produce a liquid phase of solvent and dissolved tar, and a solid phase of sand, and then separating the liquid phase from the solid phase and subsequently recovering the tar from the solvent.

A very direct method to separate the solvent and tar liquid phase from the sand is by filtration. However, in petroleum processing, such enormous volumes of material are handled that the usual filtering methods are unattractive. The use of batch-type filter presses could not economically provide enough filtering capacity for the thousands of barrels of material to be treated, and large continuous filters of the rotating drum type or of the moving belt type are so costly to build, to operate, and to maintain for large flow streams that they are uneconomical in producing a product that must compete with low cost material such as liquid crude oil. Additionally, the presence of fines, or silt, in tar sand makes filtering a difficult operation because high pressure is necessary to drive liquid through the filter cake.

THE INVENTION

This invention involves a process for recovering tar from tar sand by a solvent extraction method. The process produces a hydrocarbon product substantially free of fines without the necessity of employing a highly burdened particle separator. The process also produces sand that is substantially free of solvent; and the sand that is recovered contains all, or substantially all, of the fines in the original tar sand charge.

The process is initiated by subjecting tar sand to solvent extraction in an expanded, or mobile, bed within an extraction zone. Preferably, the tar sand is ground and pre-mixed with solvent before being introduced into extraction zone; and in the extraction zone, it is maintained as an expanded or mobile bed by an upwardly moving stream of solvent. The term *mobile bed* is intended to mean a bed of solid particles in an upwardly moving liquid stream wherein the combined effect of moving liquid and buoyancy cause the particles to be supported primarily by the liquid instead of being supported by resting on each other.

A liquid hydrocarbon phase consisting of tar dissolved in solvent is removed from the mobile bed through a passageway that starts within the bed, passes laterally from it, and terminates above the upper level of the bed. It has been found that a mobile particle bed acts as a self-cleaning filter which removes substantially all of the fines from a liquid stream removed laterally therefrom. The liquid stream removed from the mobile bed in the extraction zone may be subjected to a final particle separation before it is fractionated to remove solvent from the tar product, but the removal of the small amount of entrained fines from the product stream is a feasible process step in the process of this invention because the small amount of entrained fines does not require treating large amounts of solids. For example, the fines may be removed readily by subjecting the liquid stream to centrifugal separation in apparatus such as a hydroclone, or even filtration may be employed because the small solids content of the large volume liquid stream does not result in rapidly clogging filters.

The process may include subjecting the stream including solvent, tar, and entrained fines to high energy vibration at sonic or supersonic frequencies employing sufficient energy to dislodge any tar adhering to solid particles prior to particle separation. The process may also be benefited by water washing followed by phase separation prior to fractionating the product stream into tar and solvent fractions. The water wash tends to entrain any remaining suspended fines in the water phase and is therefore a low-cost, final cleaning step before the product is recovered.

The sand in the extraction zone is removed from the lower portion thereof and passed into an elutriation zone. The sand, saturated with a hydrocarbon phase consisting of solvent and dissolved tar, is passed into the elutriation zone wherein the sand particles are contacted with an upwardly flowing stream of water. In the elutriation zone at least two desirable effects are obtained. The first effect is that substantially all of the hydrocarbon phase is dislodged from the sand particles and removed from the elutriation zone as a separate phase. The elutriation zone provides good contact between the water phase and the particles so that substantially complete removal of hydrocarbon is effected, particularly since the sand particles are preferentially wetted by water. The second desirable effect is that the preferentially wetted fines particles enter the water phase so that recycled hydrocarbon phase does not carry large quantities of solid particles back into the extraction zone.

A liquid phase removed from the upper portion of the elutriation zone is passed to a phase separator wherein a water phase separates from a hydrocarbon phase. The hydrocarbon phase may be returned to the extraction zone while the water phase is returned to the lower portion of the elutriation zone. A mixed stream of water and sand is removed from the lower portion of the elutriation zone, the mixed sand and water stream containing substantially no hydrocarbon. This stream may be separated into a water phase and a sand phase and the water may be recirculated to the system while the sand is discarded. When sufficient water is available, the sand-water stream may be disposed of. The term water, as used herein, includes water that has added to it surface-active agents or other agents that improve its ability to wet sand, dislodge hydrocarbon, or perform other of the functions that the water phase is supplied to perform.

The process described above employs an elutriation zone and an extraction zone, each of which have overflow and underflow streams and intermediate streams circulating between them. However, the combined effect of the extraction zone and the elutriation zone as described above is that this system produces two ultimate exit streams, one a solvent-tar stream that is substantially free of solids and the other a water-solids stream that is substantially free of hydrocarbon. The intermediate streams serve to insure that all hydrocarbon in the system is in the solvent-tar stream and that all sand, fines, and water in the system are discharged via the water-solids stream. The overall result is an economical process that avoids solvent losses and avoids highly burdened solids separators.

The process of this invention may be best described in reference to the accompanying drawing which is a highly schematic representation of one process embodying this invention. For simplicity, pumps, valves, controllers, etc., are omitted from the drawing; and it is understood that conventional equipment performing the appropriate functions will be supplied where needed.

In the drawing, a low-energy mixer 10, such as a cement mixer, is employed to produce an initial charge to the process. To mixer 10 tar sand is added via line 11 and recycle solvent which contains dissolved tar is introduced through line 12. The slurry of solvent and tar sand passes from mixer 10 through line 13 into an intermediate portion of extraction vessel 15. In extraction vessel 15 a mobile bed of tar sand in a rising solvent stream is maintained with its upper surface about at a position indicated at 16. The upper portion of the extraction zone 17 is enlarged while an internal baffle 18 extends down from the top of the extraction zone to form an opening 20 through which liquid can be removed laterally from the bed maintained within the extraction zone 15 and passed from the vessel from a point above the bed. The bed of tar sand particles is maintained mobile by introducing a solvent-stream 21 at the lower end of the zone 15 and removing a solvent-tar liquid phase through the line 22 from the top of enlarged zone 17. A particle-laden solvent-tar stream is removed through the before-mentioned line 12 from the upper portion of the bed maintained within extraction zone 15 and returned through the low energy mixer 10.

As discussed above, the removal of liquid phase from the mobile bed through the gap 20 provides a stream in line 22 that is substantially free of particles. There is some entrainment of fines in line 22 but it is of small enough quantity so that physical separation of the solid phase from the liquid phase is feasible regardless of the volume of liquid phase involved.

From the bottom of extraction zone 15 a stream of sand particles and solvent-tar liquid is withdrawn and passed via line 23 into elutriation zone 25. In elutriation zone 25 a mobile bed is maintained by a rising stream of water which enters zone 25 in the lower portion through line 26. Fine particles are carried upward by the water while coarse particles descend. Liquid containing the fines is removed through line 27 from the upper portion of elutriation zone 25 and is passed into phase separator 28. In phase separator 28 the mixture settles into a water phase and a hydrocarbon phase which was dislodged from the sand particles in elutriation zone 25. The hydrocarbon phase is removed via line 31 from the upper portion of phase separator 28 and is returned to extraction zone 15 in the embodiment shown herein. The line 30 passes from the bottom of phase separator 28 and returns water phase, and almost all of the fines carry over through line 27 to a lower portion of the fluidized bed maintained in the elutriation zone 25.

From the lower portion of elutriation zone 25 a mixed stream of sand particles and water is discharged through line 32, and this mixed stream is shown schematically as being separated into a sand fraction 33 which is discarded and a water fraction 35 which is collected in vessel 36 and returned via the above-mentioned line 26 to the lower portion of elutriation zone 25.

In one embodiment, the hydrocarbon phase recovered from the upper portion of extraction zone 15 passes into a device 40 which subjects this stream to vibrations having sufficient energy to dislodge tar from the surface of sand particles. As a result, any tar remaining on the sand particles in the stream enters the solvent-tar hydrocarbon phase and passes through line 41 through particle separator 42 wherein final separation of solids from the stream is effected. The solids flow through line 43 and are returned via line 31 to the extraction zone while the liquid phase passes through line 45 and in this embodiment is mixed with water from line 46 and passed into phase separator 47. The water phase, with entrained fines, passes from separator 47 through line 48, while line 49 passes clean hydrocarbon phase to fractionator 50 wherein it is separated into a solvent fraction which passes through line 21 back to the extraction zone and a product tar fraction which passes through 51 to further processing.

As stated above, the process as shown is schematic and represents only one embodiment of this invention. There may be many modifications and changes to the process without removing it from the scope of the invention.

As a specific example of the process of this invention, a cement mixer is employed as a low-energy first-stage mixing device. Ground tar sand and toluene containing some dissolved tar are charged to the mixer. Enough liquid is charged to the low-energy mixer to produce a flowable slurry of tar sand in toluene and the slurry is passed into an expanded bed of tar sand in an upwardly flowing solvent stream. Fresh toluene is added at a rate of 0.25 gallon per pound of tar and the upwardly flowing liquid stream is divided between the portion that recirculates to the low energy mixer and the product portion that is withdrawn first laterally and then vertically so that it is removed from the mobile bed laterally and withdrawn from above the upper level of the bed.

The product stream consists of a tar-solvent liquid containing about 0.1 pound of fines per gallon of liquid. This stream is subjected to final fines removal by centrifugal separation in a series of hydroclones, it is washed with water and the resultant hydrocarbon stream is fractionated conventionally into a tar fraction and a solvent fraction, the latter being returned to the extraction zone as fresh solvent and the former being recovered as the product from the process.

From the lower portion of the mobile bed in the extraction zone a mixture of sand and hydrocarbon phase is withdrawn and introduced into the center portion of an elutriation zone wherein a mobile bed of solid particles is maintained in an upwardly flowing liquid stream. The elutriation zone is charged at a lower portion thereof with 0.1 gallon of water per pound of sand, the water containing dissolved therein enough sodium hydroxide to produce a 0.3 molar solution. A mixed phase system is withdrawn from the upper portion of the elutriation zone and passed to a phase separation zone wherein hydrocarbon phase is withdrawn from the upper portion and water phase is withdrawn from the lower portion. Fines are entrained in both the hydrocarbon phase and in the water phase, but the distribution of fines is much heavier in the water phase due to preferential wetting. The hydrocarbon phase is returned to the extraction zone at an intermediate point therein and the water phase is returned to the lower portion of the elutriation zone. A mixed water and sand phase is withdrawn from the bottom of the elutriation zone and separated into water and sand phases, the former being recirculated to the elutriation zone and the latter being discarded.

The underflow from the hydroclone centrifugal separators consists of a small liquid stream densely loaded with fines particles and it, too, is returned to the extraction zone.

Examination of the sand indicates that 99.7 percent of the total solids charged are recovered in the sand phase and it contains 0.6 percent total hydrocarbon and only 0.1 percent solvent. Examination of the hydrocarbon phase indicates that 95 percent of the tar in the tar sand is recovered as product.

What is claimed is:

1. A process for recovering tar from tar sand comprising:
   (A) maintaining a mobile bed of tar sand in a rising stream of hydrocarbon solvent in an extraction zone;
   (B) withdrawing liquid hydrocarbon laterally from the expanded bed in the extraction zone through a passageway that passes above the expanded bed and separating particles and solvent therefrom to produce a tar product;
   (C) passing sand from a lower portion of the extraction zone into a mobile bed of sand in a rising stream of water maintained in an elutriation zone;
   (D) withdrawing liquid from the upper portion of the elutriation zone, separating it into a hydrocarbon phase and a water phase, and returning the water phase to the elutriation zone;
   (E) removing sand from the lower portion of the elutriation zone.

2. The process of claim 1 wherein said liquid hydrocarbon is subjected to vibration having energy sufficient to dislodge tar from tar sand prior to separation of particles from the liquid hydrocarbon.

3. The process of claim 1 wherein subsequent to particle separation and prior to solvent removal said liquid hydrocarbon stream is mixed with water and separated into hydrocarbon and aqueous phases whereby fines are removed from the hydrocarbon phase.

4. The process of claim 1 wherein the hydrocarbon phase separated from the liquid withdrawn from the elutriation zone is returned to the expanded bed in the extraction zone.

5. The process of claim 1 wherein the solvent is toluene.

6. The process of claim 1 wherein the water contains sodium hydroxide.

References Cited
UNITED STATES PATENTS

| | | | |
|---|---|---|---|
| 2,885,339 | 5/1959 | Coulson et al. | 208—11 |
| 2,965,557 | 12/1960 | Price | 208—11 |
| 3,392,105 | 7/1968 | Poettmann et al. | 208—11 |
| 3,459,653 | 8/1969 | Benson | 208—11 |

CURTIS R. DAVIS, Primary Examiner